(12) United States Patent
Ishida

(10) Patent No.: US 7,614,435 B2
(45) Date of Patent: Nov. 10, 2009

(54) PNEUMATIC TIRE HAVING CIRCUMFERENTIAL STRAIGHT MAIN GROOVE, ARCUATE CURVED MAIN GROOVES AND CIRCUMFERENTIAL AUXILIARY GROOVES

(75) Inventor: Masahiro Ishida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 107 days.

(21) Appl. No.: 10/531,725

(22) PCT Filed: Nov. 11, 2003

(86) PCT No.: PCT/JP03/14291

§ 371 (c)(1),
(2), (4) Date: Apr. 18, 2005

(87) PCT Pub. No.: WO2004/045871

PCT Pub. Date: Jun. 3, 2004

(65) Prior Publication Data

US 2006/0162831 A1 Jul. 27, 2006

(30) Foreign Application Priority Data

Nov. 19, 2002 (JP) .............................. 2002-335046

(51) Int. Cl.
*B60C 11/03* (2006.01)
(52) U.S. Cl. .............................. 152/209.27; 152/209.28
(58) Field of Classification Search ............ 152/209.15, 152/209.18, 209.24, 209.26, 209.27, 209.28
See application file for complete search history.

(56) References Cited

U.S. PATENT DOCUMENTS

| 2,878,852 | A | * | 3/1959 | Lippmann et al. ........ 152/209.2 |
| 4,424,844 | A | | 1/1984 | Fontaine |
| 5,567,253 | A | | 10/1996 | Iwamura |
| 5,766,383 | A | | 6/1998 | Hasegawa et al. |
| 5,996,661 | A | * | 12/1999 | Gerresheim et al. .... 152/209.28 |
| 6,119,745 | A | | 9/2000 | Sugihara |
| 6,340,040 | B1 | * | 1/2002 | Ikeda ................... 152/209.27 |

FOREIGN PATENT DOCUMENTS

| DE | 4239475 | * | 5/1994 |
| DE | 4302365 | * | 8/1994 |

(Continued)

OTHER PUBLICATIONS

Machine Translation for Japan 07-164829, dated Sep. 13, 2008.*

(Continued)

*Primary Examiner*—Steven D Maki
(74) *Attorney, Agent, or Firm*—Greer, Burns & Crain, Ltd.

(57) ABSTRACT

A pneumatic tire having improved noise buffering capability and operation stability while maintaining excellent water discharge capability. A circumferential straight main groove (1) is provided at the center of a tread center region. Arc-like curved main grooves (3) where a plurality of arc-like grooves (3a) are circumferentially formed so as to be continuous in a repeated manner are arranged on both sides of the straight main groove (1). Further, circumferential auxiliary grooves (4) with a width smaller than that of any of the straight main groove (1) and arc-like curved main grooves (3) are provided in each of both tread shoulder regions.

6 Claims, 2 Drawing Sheets

FOREIGN PATENT DOCUMENTS

| | | | |
|---|---|---|---|
| EP | 0 602 989 A1 | | 6/1994 |
| EP | 0 997 323 A2 | | 5/2000 |
| EP | 1 106 395 A2 | | 6/2001 |
| JP | 62-026104 | * | 2/1987 |
| JP | 64-036505 | * | 2/1989 |
| JP | 03-074208 | * | 3/1991 |
| JP | 04-345503 | | 12/1992 |
| JP | 06-106915 A1 | | 4/1994 |
| JP | 6-270609 | * | 9/1994 |
| JP | 07-040712 A1 | | 2/1995 |
| JP | 07-164829 A1 | | 6/1995 |
| JP | 8-142613 | * | 6/1996 |
| JP | 2644499 B2 | | 5/1997 |
| JP | 09-220912 | | 8/1997 |
| JP | 10-16515 | | 1/1998 |
| JP | 10-297220 | | 11/1998 |
| JP | 11-091313 | | 4/1999 |
| JP | 11-227420 | | 8/1999 |
| JP | 3162866 B2 | | 2/2001 |
| JP | 2001-206017 A1 | | 7/2001 |
| JP | 2002-059711 | * | 2/2002 |

OTHER PUBLICATIONS

PCT International Search Rerport for PCT/JP03/14291 mailed on Mar. 2, 2004.

* cited by examiner

PNEUMATIC TIRE HAVING CIRCUMFERENTIAL STRAIGHT MAIN GROOVE, ARCUATE CURVED MAIN GROOVES AND CIRCUMFERENTIAL AUXILIARY GROOVES

TECHNICAL FIELD

The present invention relates to a pneumatic tire, and more particularly, to a pneumatic tire to improve noise buffering capability and operation stability while maintaining water discharge capability.

BACKGROUND ART

A pneumatic tire having a tread pattern where a plurality of straight main grooves are circumferentially provided on a tread surface is known as disclosed in Japanese Patent Application Kokai publication No. Hei 7 (1995)-164829 and the like, for example.

However, although the pneumatic tire having a tread pattern as described above is excellent in water discharge capability, on the contrary, the pneumatic tire has suffered from a disadvantage that cavity noise is large.

In order to reduce a disadvantage of having cavity noise caused by the straight main grooves provided circumferentially as described above while maintaining an advantage of having excellent water discharge capability caused by the straight main grooves as much as possible, a plurality of tread patterns where main grooves having a V-shape are provided have been proposed.

However, the tread pattern where main grooves having a V-shape are provided does not necessarily have sufficient water discharge capability at a time when a vehicle travels in a straight direction for their widths. To overcome this problem, however, if the width is broadened in order to improve the water discharge capability, a footprint width will decrease, thereby leading to the reduction of cornering force which causes the operation stability to decrease.

Therefore, the capability level of the pneumatic tire in which main grooves having a V-shape are provided as described above does not always exceed the capability level of the pneumatic tire based on circumferential straight main grooves as described in the aforementioned Japanese Patent Application Kokai publication No. Hei 7 (1995)-164829.

DISCLOSURE OF THE INVENTION

An object of the present invention is to provide a new pneumatic tire in order to solve the aforementioned problems in the prior art, and to improve noise buffering capability and operation stability while maintaining water discharge capability at a high level.

A pneumatic tire of the present invention achieving the aforementioned object is characterized in that: a circumferential straight main groove is provided at the center of a tread center region; a plurality of arc-like curved main grooves which are circumferentially formed so as to be continuous in a repeated manner are arranged on each side of the straight main groove; and further, circumferential auxiliary grooves with a width smaller than that of any of the straight main groove and arc-like curved main grooves is provided in each of both tread shoulder regions respectively.

By providing the straight main groove and the pair of left and right arc-like curved main grooves in a tread center region as described above, efficient water discharge can be performed by use of these three main grooves. Furthermore, since two of the three main grooves are made to be arc-like curved main grooves, where a plurality of arc-like grooves are circumferentially formed so as to be continuous in a repeated manner, cavity noise does not easily occur and cavity noise around 1 kHz can be reduced to a large extent.

Moreover, since the arc-like curved main grooves have a total length of edges longer than that of the straight main grooves, wet skid performance on a road having a low friction coefficient can be improved.

In addition, by providing three circumferential main grooves in the tread center region while separating them from the tread shoulder region which is subjected to large load in cornering, the rise in contact pressure and the change in shear stress which may occur in a main groove wall (rib edge/block edge) can be suppressed, and road holding ability can be improved. As a result, the cornering force is increased and operation stability is improved.

Moreover, since auxiliary grooves are provided in the tread shoulder region which is subjected to large load in cornering, heat radiation capability are improved and heat sag which may occur in continuous running in a circuit or the like can be buffered. Additionally, since each of the auxiliary grooves has a width smaller than that of any of the three circumferential main grooves, the block rigidity in this tread shoulder region is increased and the operation stability can be improved also in this point. Here, the aforementioned "heat sag" means a phenomenon that rubber is softened due to the heat generation in running and the driving performance reduces.

According to the present invention, as described above, noise buffering capability and operation stability can be improved while maintaining excellent water discharge capability.

DESCRIPTION OF REFERENCE NUMERALS

1: straight main groove
2: rib
3: arc-like curved main groove
4: auxiliary groove
5a, 5b: inclined groove

BEST MODE FOR CARRYING OUT THE INVENTION

Hereinafter, an embodiment of the present invention will be described with reference to FIG. 1.

Figure 1:
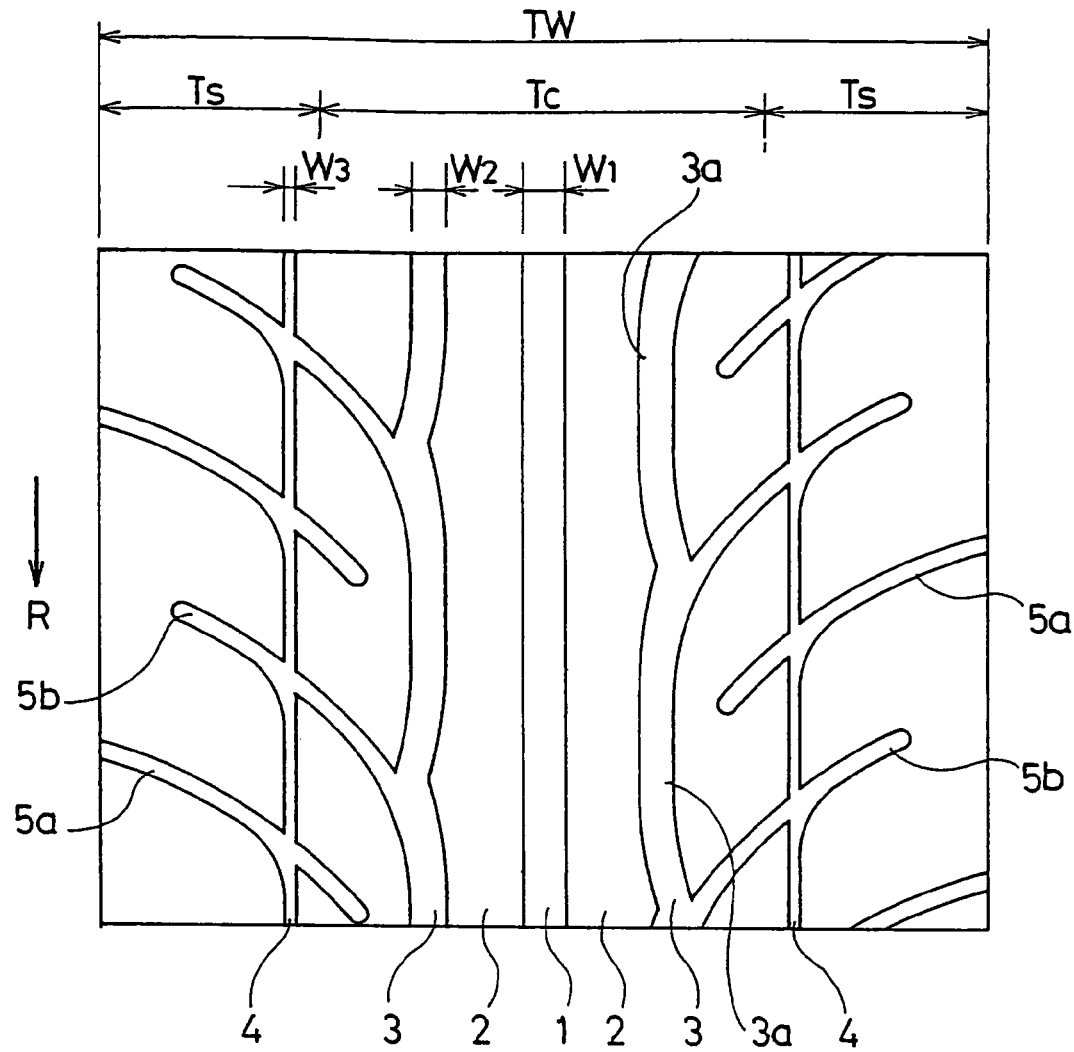
FIG. 1 is an expanded view showing a principal part of a tread surface of a pneumatic tire according to an embodiment of the present invention.

FIG. 1 illustrates a principal part of a tread surface of a pneumatic tire of the present invention. A tire rotates in a given direction, specifically in a direction indicated by the arrow R. Additionally, a center region with a width Tc is assigned as a tread center region, and the tread center region has a width of 50% of a tread expanded length TW. Respective regions on both sides of the tread center region with a width Ts are assigned as tread shoulder regions, and each of the tread center regions has a width of 25% of the tread expanded length TW.

In the tread center region with a width Tc, there is provided a straight main groove 1 which extends circumferentially on a tread surface and is located at the center of the tread width.

On both right and left sides of this straight main groove 1, arc-like curved main grooves 3 and 3 extending in a tire circumferential direction are provided respectively with ribs 2 and 2 interposed therebetween. The arc-like curved main grooves 3 are formed so that a plurality of arc-like grooves 3a are circumferentially formed so as to be continuous in a repeated manner. The orientation of a convex portion of each arc-like groove 3a points to a center side (inside) in FIG. 1, but the orientation thereof may point to an outside instead of inside.

In the present invention, the number of the plural arc-like grooves 3a which exist circumferentially so as to be continuous in a repeated manner is preferably set at a range of 20 to 32, more preferably at a range of 23 to 29. "Arc-like curve" is not so strictly limited in shape, and may be one which can be considered as "arc-like curve" substantially as a whole in light of the spirit of the present invention.

However, the arc-like curved main grooves 3 are preferably configured to be in a see-through state in the tire circumferential direction. "See-through" means that when the arc-like curved main grooves 3 are seen in the tire circumferential direction, the arc-like curved main grooves 3 can be seen without obstruction to view caused by left and right groove walls. When the arc-like curved main grooves 3 are configured to be in a see-through state as described above, drainage resistance is reduced and an advantageous situation for maintaining excellent water discharge capability can be increased.

In each of the tread shoulder regions with a width Ts, auxiliary grooves 4 and 4 extending in a line in the tire circumferential direction are provided respectively. The width of the auxiliary groove 4 is formed to be smaller than that of straight main groove 1 and arc-like curved main groove 3. In addition, in the left and right auxiliary grooves 4 and 4, a plurality of inclined grooves 5a and 5b are provided so as to cross the auxiliary grooves diagonally. The inclined grooves 5a and 5b are provided with a given interval therebetween in a tire circumferential direction so as to be alternate with each other.

The inclined grooves 5a and 5b gradually incline from the tread center region to the tread shoulder region in a direction reverse to a tire rotation direction. Additionally, the inclined groove 5a extends from an intermediate point between the arc-like curved main groove 3 and the auxiliary groove 4 to the edge of the tread shoulder region, and on the other hand, the inclined groove 5b extends from the arc-like curved main groove 3 as a starting point to the middle of the tread shoulder region. These inclined grooves 5a and 5b work to discharge water entered into the tread center region to the side of the tire through the tread shoulder, thereby improving water discharge capability.

In the pneumatic tire of the present invention, since the straight main groove 1 and the pair of left and right arc-like curved main grooves 3 and 3 are provided in the tread center region as described above, water discharge can be performed efficiently. Furthermore, two of the three main grooves are arc-like curved main grooves 3 and 3, where the plurality of arc-like grooves 3a are formed so as to be continuous in a repeated manner and connected to each other, and thereby the occurrence of cavity noise can be suppressed and in particular cavity noise around 1 kHz can be reduced to a large extent. Moreover, since the arc-like curved main grooves 3 have a total length of edges longer than that of the straight main grooves 1, wet skid performance on a road having a low friction coefficient can be improved.

Furthermore, since the three circumferential main grooves 1, 3, and 3 are provided in the tread center region instead of the tread shoulder region where large load is applied in cornering, the rise in contact pressure and the change in shear stress, which may occur in the rib edge or block edge formed in the tread center region, can be suppressed, whereby road holding ability of the tread can be improved. As a result, the cornering force is increased and operation stability is improved.

Moreover, since the auxiliary grooves 4 provided in the tread shoulder region promote heat radiation capability in the tread shoulder region, heat sag which may occur, for example, in continuous running in a circuit or the like is buffered. Additionally, since each of the auxiliary grooves 4 has a width smaller than that of any of the circumferential main grooves 1, 3, and 3, the rigidity of the block formed in the tread shoulder region is increased and the cornering force is increased. Also in this point, the operation stability can be improved.

In the present invention, the widths of the straight main groove and the arc-like curved main groove may be the same or different from each other. Each of the widths is preferably set at a range of 5 to 15 mm respectively. Moreover, the width of the auxiliary groove is smaller than that of the straight main groove and the arc-like main groove, and preferably set to 50% or below of the width of the straight main groove and the arc-like curved main groove. Additionally, the width of the auxiliary groove is preferably set at a range of 1 to 5 mm. The width of the inclined groove is preferably set at a range of 1 to 7 mm. By selecting the size of the widths as described above, the aforementioned effect of the present invention can be further improved.

EMBODIMENTS

Four kinds of pneumatic radial tires according to the embodiment and Comparative Examples 1 to 3 were manufactured. The tire size of respective tires is the same, specifically 235/45R17. The tread patterns thereof are different from each other as shown in FIGS. 1 to 4. The widths of main grooves and auxiliary groove W1, W2, and W3 are different from each other as shown in table 1. (Additionally, with respect to the total sum of the width of the grooves, all the tires are the same.)

Figure 2:
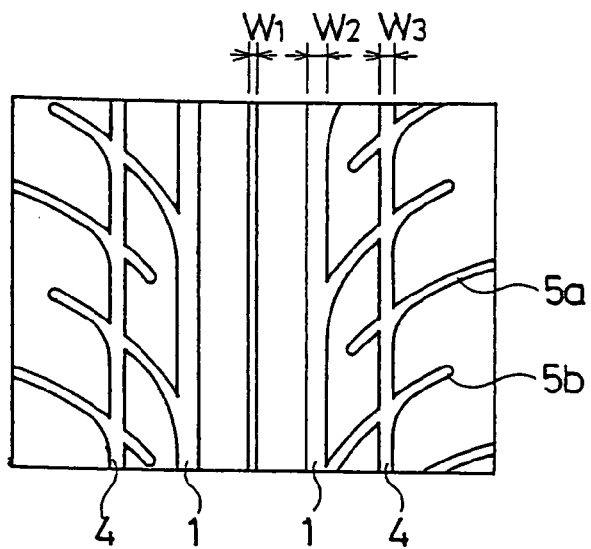
FIG. 2 is an expanded view showing a principal part of a tread surface of a pneumatic tire according to Comparative Example 1.

Note that the tread pattern of FIG. 2 is one whose basic configuration is made to be similar to a tire disclosed in Japanese Patent Application Kokai publication No. Hei 7 (1995)-164829.

These four kind of tires were respectively fitted to rear wheel/front wheel of a domestically produced car of 2000 cc displacement, on which an engine with a turbocharger was mounted, with air pressure set to 220/190 kPa (rear wheel/front wheel). Then water discharge capability, noise buffering capability, and operation stability were measured by use of the measurement method described below. Results are shown in Table 1.

[Water Discharge Capability]

The speed when running straight on a wet road with a water depth of about 10 mm and hydroplaning was occurred was measured. Evaluation is indicated by an index with the measured value of the tire according to Comparative Example 1 being defined as 100. A larger index represents more excellent water discharge capability.

[Noise Buffering Capability]

In conformity with ISO STANDARD: WD 13325-EU, pass-by noise was measured. Evaluation was performed by use of inverse numbers of the measured values and indicated by an index with inverse numbers of the measured value of the tire according to Comparative Example 1 being defined as 100. A larger index represents more excellent noise buffering capability.

[Operation Stability]

Sensory road tests by five test drivers in a circuit were preformed, and the average value of evaluation scores by the five test drivers was used for the evaluation. The evaluation is indicated by an index with evaluation value of the tire according to Comparative Example 1 being defined as 100. A larger index represents more excellent operation stability.

TABLE 1

Figure 3:
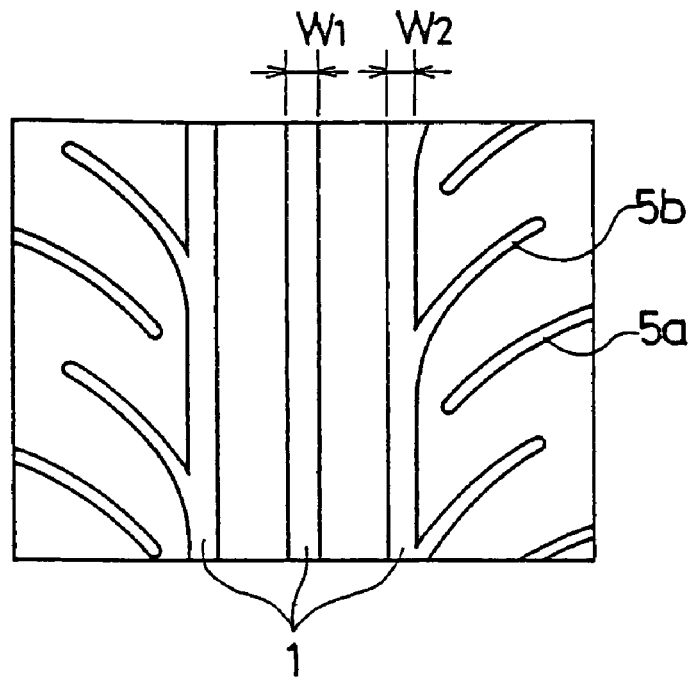
FIG. 3 is an expanded view showing a principal part of a tread surface of a pneumatic tire according to Comparative Example 2.
Figure 4:
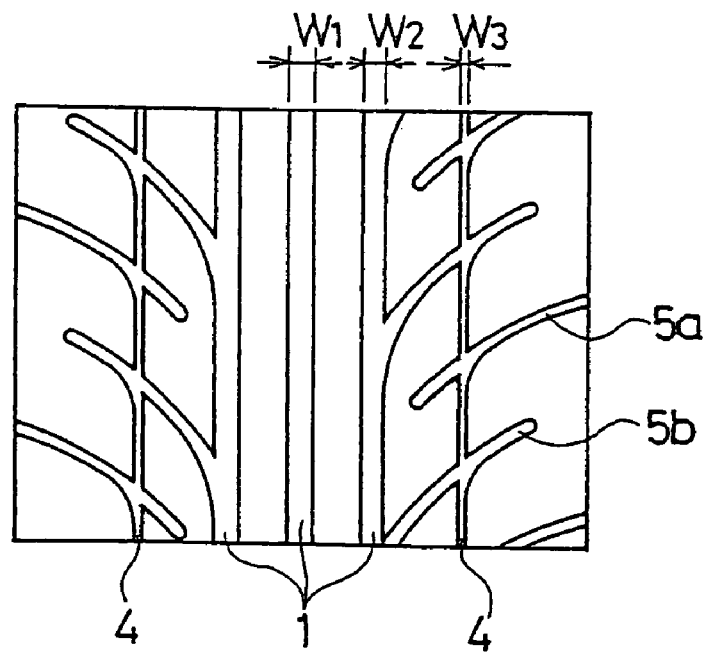
FIG. 4 is an expanded view showing a principal part of a tread surface of a pneumatic tire according to Comparative Example 3.

|  | Tread pattern | Width (mm) | | | Water discharge capability (index) | Noise buffering capability (index) | Operation stability (index) |
| --- | --- | --- | --- | --- | --- | --- | --- |
|  |  | W1 | W2 | W3 |  |  |  |
| Example | FIG. 1 | 12 | 10 | 3 | 100 | 107 | 108 |
| Comparative Example 1 | FIG. 2 | 4 | 10 | 7 | 100 | 100 | 100 |
| Comparative Example 2 | FIG. 3 | 14 | 12 | — | 102 | 99 | 105 |
| Comparative Example 3 | FIG. 4 | 12 | 10 | 3 | 102 | 101 | 109 |

INDUSTRIAL APPLICABILITY

The present invention can be applied to tire industry, and consequently to automobile industry.

What is claimed is:

1. A pneumatic tire, having a predetermined direction of rotation, comprising:
   a circumferential straight main groove provided at a center of a tread center region;
   an arcuate curved main groove provided on each side of the straight main groove, where each of said arcuate curved main grooves is composed of a plurality of arcuate grooves that are circumferentially formed, said arcuate grooves including adjacent inner side edges, that face said circumferential straight main groove and that are connected to each other, so as to be continuous in a repeated manner, and wherein each of said arcuate curved main grooves is circumferentially formed to be in a see-through state;
   a circumferential auxiliary groove, provided in each tread shoulder region, each circumferential auxiliary groove having a width smaller than that of any of the straight main groove and the actuate curved main grooves;
   wherein a plurality of inclined grooves are provided circumferentially with a given interval therebetween so as to cross the auxiliary grooves diagonally, with all of said inclined grooves being inclined in the same direction with respect to said associated auxiliary groove, and further wherein an incline direction of said inclined grooves, when considered from said tread center region to each of said tread should regions, is opposite to that of said predetermined direction of rotation,
   wherein said inclined grooves include a first set of inclined grooves and a second set of inclined grooves, wherein inclined grooves from said first set alternate with inclined grooves from said second set,
   wherein inner edge portions of said first set of inclined grooves are connected to the arcuate curved main groove and outer edge portions of said first set of inclined grooves are located within the tread shoulder region without extending to an outer edge of the tread shoulder region, and
   further wherein outer edge portions of said second set of inclined grooves are connected to outer edges of the tread shoulder region, and inner edge portions of said second set of inclined grooves extend into the tread center region but terminate prior to reaching said arcuate main grooves.

2. The pneumatic tire according to claim 1, wherein each of the widths of the straight main groove and the arcuate curved main groove is 5 to 15 mm.

3. The pneumatic tire according to claim 1, wherein the width of the auxiliary groove is 1 to 5 mm.

4. The pneumatic tire according to claim 1, wherein the width of the inclined groove is 1 to 7 mm.

5. The pneumatic tire according to claim 1, wherein each arcuate groove, of the arcuate curved main groove, is defined between two convex side edges, when considered relative to the circumferential straight main groove.

6. The pneumatic tire according to claim 1, wherein the arcuate grooves of the arcuate curved main groove each include a convex side edge surface.

* * * * *